United States Patent [19]

Wright

[11] 4,335,573
[45] Jun. 22, 1982

[54] GAS TURBINE ENGINE MIXER

[75] Inventor: Jack D. Wright, Mason, Ohio

[73] Assignee: General Electric Company, Cincinnati, Ohio

[21] Appl. No.: 78,333

[22] Filed: Sep. 2, 1970

[51] Int. Cl.³ .............................. F02K 3/10; F02K 3/04
[52] U.S. Cl. ........................................ 60/261; 60/262
[58] Field of Search ................ 60/226, 262, 265, 266, 60/261

[56] References Cited

U.S. PATENT DOCUMENTS

| 2,753,685 | 7/1956 | Mattinson | 60/226 |
| 2,999,672 | 9/1961 | Harshman | 60/262 |
| 3,048,376 | 8/1962 | Howald et al. | 60/262 |
| 3,210,934 | 10/1965 | Smale | 60/265 |
| 3,377,804 | 4/1968 | Wright et al. | 60/262 |
| 3,508,403 | 4/1970 | Neitzel | 60/226 |

Primary Examiner—Stephen C. Bentley
Attorney, Agent, or Firm—Derek P. Lawrence

[57] ABSTRACT

An afterburning turbofan engine includes a mixer for mixing the engine generated hot gas and fan streams prior to discharge through the engine nozzle. The mixer includes a fixed upstream portion and a movable downstream portion which may be indexed to selectively interchange flow communication between the chutes of the two portions to effect a temperature reduction in the downstream mixer portion and, hence, a reduction in infrared radiation.

10 Claims, 6 Drawing Figures

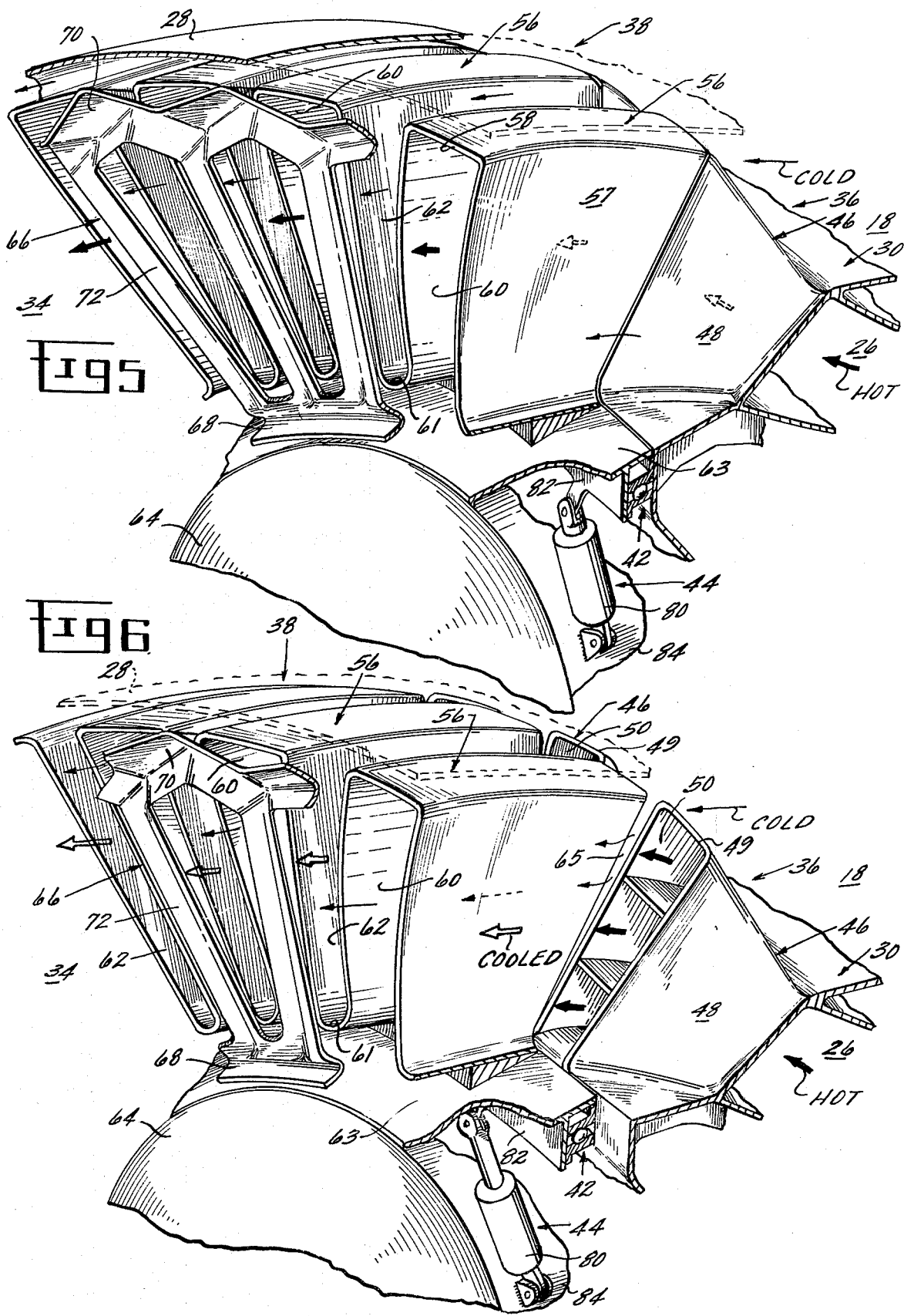

GAS TURBINE ENGINE MIXER

The invention herein described was made in the course of or under a contract, or a subcontract thereunder, with the U.S. Department of the Air Force.

This invention relates to gas turbine engines and, more particularly, to means for reducing infrared radiation emissions therefrom.

In military aircraft gas turbine engines, it is highly desirable that infrared emissions from the engine nozzle be reduced to a practical minimum, at least on a selective basis, to avoid acquisition and tracking by heat-seeking hostile forces or to permit effective countermeasures or evasive action to be taken against such forces.

A primary object of this invention is to provide a lightweight and reliable structure for mixing the hot gas and fan streams of a gas turbine engine and for selectively suppressing the infrared radiation emissions from the engine nozzle.

A further object of this invention is to provide a mixing structure for a gas turbine engine which results in a low nominal level of infrared radiation emissions from the engine nozzle.

Yet another object of this invention is to provide a convoluted mixer and flameholder arrangement which efficiently mixes the hot gas and fan streams of an afterburning turbofan engine and permits selective suppression of emitted infrared radiation.

Briefly stated, the above and other objects and advantages of the present invention are achieved by providing a convoluted mixer having a fixed upstream portion and a movable downstream portion. Means are provided for rotating or indexing the downstream portion from a first position to a second position wherein the wall members of the downstream mixer portion lobes which defined the hot gas stream chutes in said first position define the fan stream chutes in the second position. The flow axis of each chute is preferably skewed relative to the longitudinal axis of the engine to prevent a line of sight from the nozzle to the upstream mixer portion and the low pressure turbine. The skew angle is preferably selected to approximate the angle of efflux of the hot gas stream from the low pressure turbine so as to minimize flow losses. The downstream mixer portion is preferably adapted to accelerate the fluid flow therethrough and discharge such flow in a generally axial direction.

Stated another way, a gas turbine engine of the type having a fan for pressurizing a stream of air through an annular fan duct and a core engine for generating an annular hot gas stream includes a convoluted structure for efficiently mixing the two streams prior to discharge through an exhaust nozzle of such engine. The mixer comprises an upstream portion and a downstream portion. Each mixer portion includes an annular array of generally radially projecting, peripherally spaced lobes which are interconnected at their radial inner ends so as to define a generally radially and axially elongated chute within each lobe and between adjacent pairs of lobes. The chutes of the upstream mixer portion which are defined internally of the lobes are adapted to receive the hot gas stream while the remaining chutes receive the cooler fan stream. The downstream mixer portion is movable and suitable means are provided to index that portion between a first position, wherein the lobes of each mixer portion are aligned in the direction of flow, and a second position wherein the lobes of the downstream mixer portion are positioned between the lobes of the upstream mixer portion so as to permit selective interchange of the downstream mixer portion chutes that carry the hot and cold streams and, hence, a reduction in metal temperatures and emitted infrared radiation.

The inlet to each downstream lobe chute is preferably smaller in circumferential width than the circumferential width of the upstream mixer portion fan stream chute outlets, at corresponding radial locations, so that when the downstream mixer portion is in its second position, a portion of the fan stream effluxing from each upstream fan chute enters the downstream chutes carrying the hot gas stream and forms a boundary layer of cool air along the sidewalls thereof.

The flameholder means are connected to the downstream mixer portion and arranged to be bathed by the fan stream when that mixer portion is in its second position.

While the specification concludes with claims particularly pointing out the novel aspects of the present invention, it is believed the invention will be better understood upon reading the following description of the preferred embodiment in conjunction with the accompanying drawings, wherein:

FIG. 5 is a partial perspective view of the mixing structure of FIG. 1, with the downstream portion of such structure disposed in its first position; and FIG. 6 is a partial perspective view of the mixing structure of FIG. 1, with the downstream portion of such structure disposed in its second position.

Figure 1:
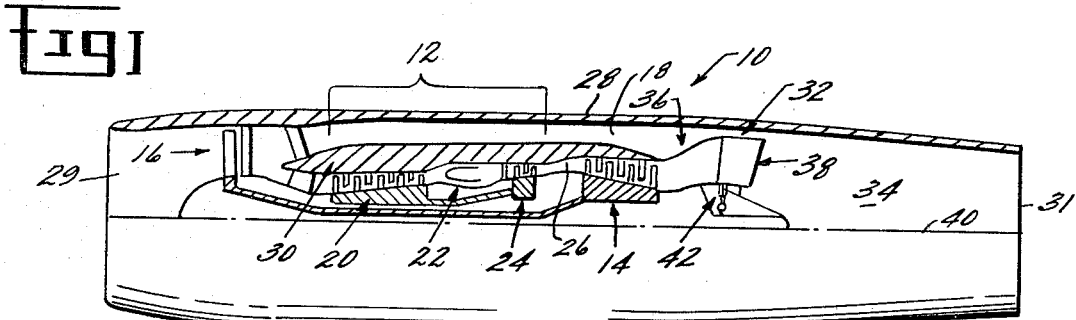
FIG. 1 is a side elevational view, in half cross section, of a gas turbine engine employing an exemplary embodiment of the mixing structure of the present invention.

Referring now to FIG. 1 of the drawings, there is shown a gas turbine engine at 10 which includes a core engine 12 for generating an annular hot gas stream; a low pressure turbine 14, downstream of the core engine; and a fan 16 which is operatively connected to the turbine 14 for pressurizing air flow through an annular duct or passage 18. The core engine has been shown as comprising a compressor 20, a combuster 22 and a high pressure turbine 24 arranged in serial flow relationship along an annular flow passage 26. The duct 18 is cooperatively defined by an outer casing 28 and a core engine casing 30. The outer casing 28 includes an upstream inlet 29 and a nozzle 31 for discharging the combined fan and hot gas streams to provide propulsive thrust for the engine. A convoluted annular structure 32 is provided to efficiently mix the fan and hot gas streams in an afterburner portion 34 prior to discharge through nozzle 31.

The mixer 32 has been generally shown in FIG. 1 as comprising an upstream portion 36 and a movable downstream portion 38 which is suitably journaled to engine supporting structure for rotation about the engine longitudinal axis 40 by bearing means 42. Means 44 which may comprise a fluid actuator, motor driven gear means, or the like, are provided to rotate or index the downstream mixer portion 38 between a first position, as shown in FIGS. 3 and 5, and a second position as shown in FIGS. 4 and 6.

Figure 2:
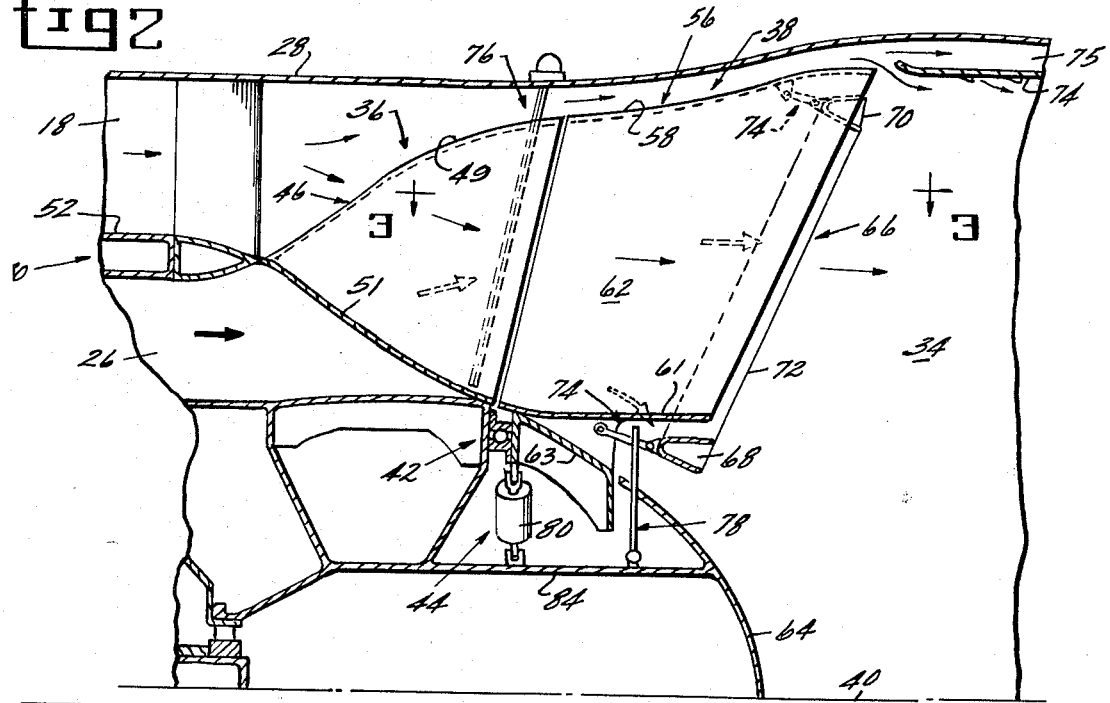
FIG. 2 is a half cross-sectional view, drawn to an enlarged scale, diagrammatically showing the mixing structure of FIG. 1.
Figure 3:
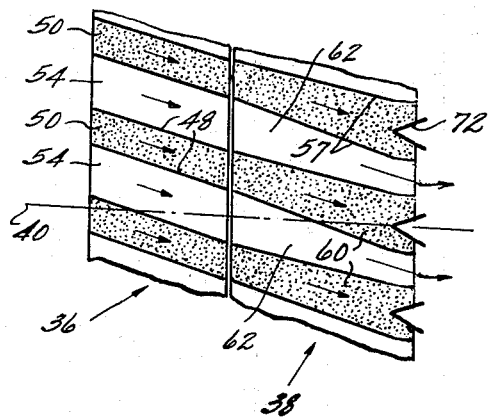
FIG. 3 is a partial cross-sectional view taken along line 3—3 of FIG. 2, with the downstream mixer portion shown in its first position.
Figure 4:
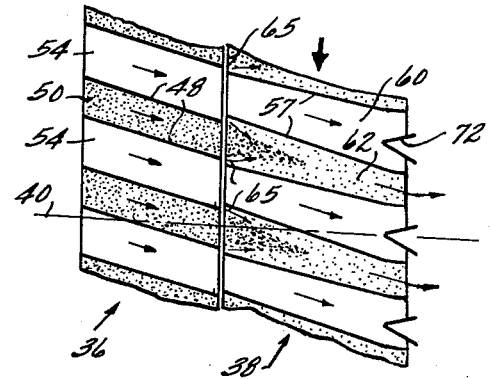
FIG. 4 is a partial cross-sectional view, like FIG. 3, with the downstream mixer portion shown in its second position.

As best shown in FIGS. 2, 3 and 6, the upstream mixer portion 36 comprises an annular array of peripherally spaced lobes 46 which extend generally radially from the inner casing 30 into the fan duct 18. Each lobe 46 includes sidewalls 48 joined by an outwardly angled outer wall 49 and defines therein a radially and axially elongated chute 50 which communicates, at its upstream end, with the core engine flow passage 26. A radial inner wall member 51 formed as a generally streamline continuation of the outer surface 52 of core engine casing 30 extends between and joins adjacent sidewalls of adjacent lobes 46 and defines an annular array of chutes 54 which communicate with the fan duct 18.

The downstream mixer portion 38 is similarly formed as a convoluted structure and includes an annular array of peripherally spaced, generally radially extending lobes 56. With reference to FIG. 5, each lobe 56 includes sidewalls 57 joined by an outer wall 58 and defines a chute 60 therewithin. Adjacent sidewalls of adjacent lobes 56 are joined at their radial inner ends by connecting wall members 61 to define chutes 62 between adjacent lobes.

The downstream mixer portion 38 includes an annular member 63, disposed inwardly of the connecting members 61, which defines the inner boundary for the flow through the downstream chutes 60 and fairs into a fixed center body member 62.

As best shown in FIGS. 3 and 5, the mixer portions 36, 38 are provided with a corresponding number of lobes 46, 56 which are arranged and formed so that with the mixer portion 38 in its first position, each chute 60 defines a generally streamline extension of a corresponding chute 50 and each chute 62 defines a generally streamline extension of a corresponding chute 54.

With reference now to FIGS. 4 and 6, the downstream mixer portion 38 has been shown in its second position wherein the chutes 60, defined internally of the lobes 56, have been indexed and now define a continuation of the upstream fan chutes 54 while the chutes 62, defined between adjacent lobes 56, have been indexed to define a continuation of the upstream hot gas stream chutes 50.

As best shown in FIGS. 3, 4 and 6, the peripheral width of the outlet of each hot gas stream chute 50 is preferably less than the peripheral width of the inlet to each downstream chute 62, at corresponding radial locations, so that when the downstream mixer portion 38 is in its second position, as shown in FIGS. 4 and 6, a discontinuity or passage 65 is established through which the relatively cool fan stream passes into chutes 62, as generally indicated by the flow arrows of FIGS. 4 and 6, to reduce the gas temperature therein and provide a film of cooling air along the sidewall surfaces defining the chutes 62.

The lobes 46 and 56 are preferably skewed relative to the engine longitudinal axis 40 so as to preclude a line of sight, upstream through the nozzle 31, to the relatively hot elements of the upstream mixer portion 36 and the low pressure turbine 14. This angle of skewing is preferably selected to approximate the discharge angle of the hot gas stream from the low pressure turbine 14 to minimize flow losses.

The downstream end of each lobe 56 is preferably formed to discharge the fan stream and hot gas stream in an axial direction, as best shown in FIGS. 3 and 4, to promote efficient flow through the afterburner 34.

The flameholder means has been shown generally at 66 as comprising an inner annular V-gutter 68 disposed radially inwardly of the lobe connecting members 61, an outer annular V-gutter 70, and a plurality of interconnecting, generally radially extending V-gutters 72. The flameholder means 66 is preferably connected to the downstream mixer portion 38 by suitable articulated support means 74 which permit unrestrained thermal expansion and contraction of the flameholder means while maintaining the annular V-gutters 68 and 70 generally concentric relative to the engine longitudinal axis 40. As best shown in FIGS. 3 through 6, the radial V-gutters 72 are preferably disposed within and adjacent the downstream ends of the lobe chutes 60 so as to reduce the effective discharge areas from those chutes and accelerate the flow therethrough to the discharge plane and to facilitate rapid cooling of the V-gutters 72 when the downstream mixer portion 38 is in its second position.

As shown in FIG. 2, the afterburner 34 may include a liner 74 wich is spaced radially inwardly of the casing 28 so as to define an annular passage 75 therebetweeen for receipt of fan pressurized air and protection of the casing 28 from the high temperature generated during augmented engine operation. The outer walls 49 and 58 of the mixer 32 are preferably spaced from the casing 28 to permit an annular flow of fan air to the passage 75 and to provide cooling for such walls.

Means, such as fuel spray bars 76, have been shown extending into selective chutes of the upstream mixer portion 36 for introduction of fuel into the afterburner 34. Means, such as lightoff spray bars 78, may be provided to effect lightoff of the afterburner 34.

The means 44 for indexing the downstream mixer portion 38 between its first position and its second position have been shown in FIGS. 2, 5 and 6 as comprising a suitable fluid actuator 80 pivotably connected between a radial flange 82 of the movable mixer portion 38 and stationary engine support structure 84. It will be understood, however, that the moving means employed may be widely varied and may comprise motor-driven gear means, ball-screw actuators and the like.

The use, operation and function of the present invention are as follows:

During normal augmented and unaugmented operation of the engine 10, the downstream mixer portion 38 is positioned in its first position, as in FIGS. 3 and 5, wherein the fan pressurized stream passes through mixer chutes 54 and 62. At the same time, the hot gas stream generated by core engine 12 flows into the afterburner portion 34 through chutes 50 and 60. During afterburning engine operation, fuel is injected into the afterburner 34 through means 76 and chutes 50, 60, with lightoff being effected by means 78 and axial flame front stabilization being effected in the wake of flameholder means 66. During such engine operating modes, the level of infrared radiation emitted from nozzle 31 is significantly reduced by skewing the chute-defining lobes 46 and 56 relative to the engine longitudinal axis to prohibit a direct line of sight through the nozzle 31 into the low pressure turbine region of the engine and the hotter portions of the mixer 32 and by the cooling effect of the cool fan stream over the lobe wall surfaces defining each hot gas stream chute 60.

While the foregoing mixer arrangement in itself tends to minimize the level of infrared radiation emitted, it will be appreciated that the metallic wall members of the lobes 56 and the flameholder means 66 will nevertheless become hot enough, during both unaugmented and augmented engine operating modes, to emit significant levels of infrared radiation from the nozzle 31. To the end of selectively reducing the level of such emitted radiation, means 44 are provided to rotate the downstream mixer portion 38, about its bearing support means 42, from its first position to its second or indexed position, as shown in FIGS. 4 and 6, wherein the fan stream flows through chutes 54 and 60 and the hot gas stream flows through chutes 50 and 62. In this manner, the wall surfaces of the lobes 56 which defined the hot gas stream chutes in the first position define the fan stream chutes in the second position, whereby the metal temperatures of such walls and the infrared radiation emitted therefrom are greatly reduced. Additional temperature reduction in the downstream mixer portion is achieved by sizing the inlets to each chute 62 larger than the outlet of its associated upstream chute 50, as best shown in FIGS. 3 and 4, so that cool fan pressurized air will enter each chute 62 from its upstream adjacent fan stream chutes 54 to dilute the hot gas stream and provide a boundary layer of cool air along its wall surfaces.

By positioning the annular V-gutter 68 radially inwardly of the lobe connecting members 61 and by locating the radial V-gutters 72 within the lobe chutes 58, when the mixer portion 38 is disposed in its second position, flameholder means 66 is, with the exception of small portions of the outer annular V-gutter 70, bathed exclusively with the cool, fan pressurized air to promote rapid cooling and further reduce the emitted radiation level.

From the foregoing, it will be appreciated that the present invention provides an efficient mixing structure and flameholder arrangement for a gas turbine engine which permits selective reduction of radiation emitted from the nozzle of such engine so as to avoid acquisition, lock-on or tracking by infrared sensitive, hostile forces, or to permit effective evasive action with respect to such forces.

While a preferred embodiment has been depicted and described, such is intended to be descriptive only and not definitive, it being understood that numerous substitutions modifications and variations may be made thereto without departing from the invention's fundamental theme.

What is claimed is:

1. A convoluted annular mixer for use in a gas turbine engine and of the type defining an annular array of radially and axially elongated, alternating first and second chutes, said mixer including an upstream portion a and downstream portion, the first and second chutes of said upstream portion adapted to receive, respectively, an inner annular hot gas stream and an outer annular fan stream of said engine, and means for indexing said downstream portion from a first position, wherein the upstream first and second chutes are disposed in fluid flow communication, respectively, with the downstream first and second chutes, and a second position wherein such fluid flow communication is reversed, whereby the temperature of said downstream mixer portion and, hence, emitted infrared radiation therefrom may be selectively reduced.

2. The mixer of claim 1 further characterized in that said chutes are skewed relative to the longitudinal axis of said engine.

3. The mixer of claim 1 further characterized by and including flameholder means carried by said downstream mixer portion and including a generally radially extending V-gutter disposed in said first chutes.

4. The mixer of claim 1 further characterized in that each second downstream chute is formed with an inlet which is peripherally wider than the outlet of each first downstream chute, whereby when said downstream mixer portion is disposed in its second position, a portion of the relatively cool fan stream effluxing from the upstream second chute enters the downstream first chutes to dilute the hot gas stream flowing therethrough.

5. A gas turbine engine including, in combination,
 a core engine including a compressor, a combustor and a first turbine arranged in series flow relationship for generating a hot gas stream,
 a second turbine downstream of said first turbine,
 a duct,
 a fan upstream of said compressor and operatively connected to said second turbine for pressurizing a stream of air in said duct,
 means for mixing at least a portion of said fan stream and said hot gas stream,
 nozzle means downstream of said mixing means for discharging said mixed streams to provide propulsive thrust for said engine.
 said mixing means including a fixed upstream portion and a movable downstream portion, said portions defining an annular array of generally radially and axially elongated upstream and downstream first and second chutes, said upstream first chutes in flow communication with said hot gas stream and said upstream second chutes in flow communication with said fan stream, and means for indexing said downstream mixer portion to selectively communicate said upstream first and second chutes of said upstream mixer portion with alternate ones of said downstream mixer portion first and second chutes, whereby the temperature of said downstream mixer portion and, hence, infrared radiation emitted from said nozzle may be selectively reduced.

6. The structure of claim 5 further characterized in that said chutes are skewed relative to the longitudinal axis of said engine.

7. The structure of claim 5 further characterized in that said engine includes stationary engine support structure, bearing means connecting said downstream mixer portion to said stationary engine support structure for rotation about the longitudinal axis of said engine, said indexing means comprising fluid actuator means operably connected between said engine support structure and said downstream mixer portion.

8. The structure of claim 5 further characterized in that each said mixer portion includes a plurality of peripherally spaced, generally radially and axially extending lobes, each said lobe including spaced radial sidewalls joined at their outer radial edges by an outer wall member, peripherally adjacent ones of said lobes having adjacent sidewalls joined at their inner radial edges by an inner wall member, said first chutes being defined internally of said lobes and said second chutes being defined intermediate peripherally adjacent lobes.

9. The structure of claim 8 further characterized by and including flameholder means carried by said downstream mixer portion and including an inner annular V-gutter disposed radially inwardly of said downstream portion inner wall members, a plurality of generally radial V-gutters disposed, at least in part, within said first chutes of said downstream mixer portion and joining said inner annular V-gutter, and an outer annular V-gutter joining said radial V-gutters adjacent their outer ends whereby substantially all of said flameholder means is bathed in said fan stream when said downstream mixer portion is in said second position.

10. The structure of claim 8 further characterized in that said upstream and downstream portions include a corresponding number of lobes, said lobes being sized and arranged whereby each said first and second chute of said downstream portion forms, respectively, a generally streamline continuation of one of said first and second chutes of said upstream portion, with the peripheral spacing of the sidewalls of each upstream lobe being less than the peripheral spacing of the adjacent sidewalls of each pair of adjacent downstream lobes, at corresponding radial locations and at the outlets and inlet of the chutes defined by such sidewalls, with the inlet to each said first downstream chute being generally centrally located within an outlet of one said second upstream chute in said second position, whereby a portion of said fan stream is directed into each said downstream second chute to dilute the hot gas stream passing therethrough and, hence, further reduce emitted infrared radiation.

* * * * *

UNITED STATES PATENT AND TRADEMARK OFFICE
CERTIFICATE OF CORRECTION

PATENT NO. : 4,335,573
DATED : June 22, 1982
INVENTOR(S) : Jack D. Wright

It is certified that error appears in the above—identified patent and that said Letters Patent is hereby corrected as shown below:

Column 5, lines 56 and 57, delete "a and" and in its place insert --and a--.

Signed and Sealed this

First Day of February 1983

[SEAL]

Attest:

GERALD J. MOSSINGHOFF

Attesting Officer — Commissioner of Patents and Trademarks